United States Patent
Stearns

[15] 3,703,808
[45] Nov. 28, 1972

[54] TURBINE BLADE TIP COOLING AIR EXPANDER

[72] Inventor: Eldon M. Stearns, Lebanon, Ohio
[73] Assignee: General Electric Company
[22] Filed: Dec. 18, 1970
[21] Appl. No.: 99,572

[52] U.S. Cl. .................60/39.66, 415/115, 415/116
[51] Int. Cl. ...............................................F02c 7/12
[58] Field of Search ............60/39.66; 415/115, 116

[56] References Cited

UNITED STATES PATENTS

| | | | |
|---|---|---|---|
| 2,945,671 | 7/1960 | Petrie | 415/115 |
| 2,963,268 | 12/1960 | Smile | 415/110 |
| 2,988,325 | 6/1961 | Dawson | 415/110 |
| 3,365,172 | 1/1968 | McDonough | 60/39.66 |

Primary Examiner—Douglas Hart
Attorney—Derek P. Lawrence, Lee H. Sachs, Frank L. Neuhauser, Oscar B. Waddell and Joseph B. Forman

[57] ABSTRACT

A turbomachinery cooling structure wherein cooling air is delivered around a combustor to a chamber formed by stationary structure above the tips of rotating blading. Means are provided, in the form of stationary vanes of airfoil cross section, to accelerate the cooling air and to deliver the same as a tangential flow to a cavity formed above the blading. The cavity is formed by means of a rotating blade shroud, which cooperates with the above-mentioned stationary structure. The cooling air is then delivered to an internal cooling passageway of the blading.

10 Claims, 4 Drawing Figures

PATENTED NOV 28 1972　　　　　　　　　　　3,703,808
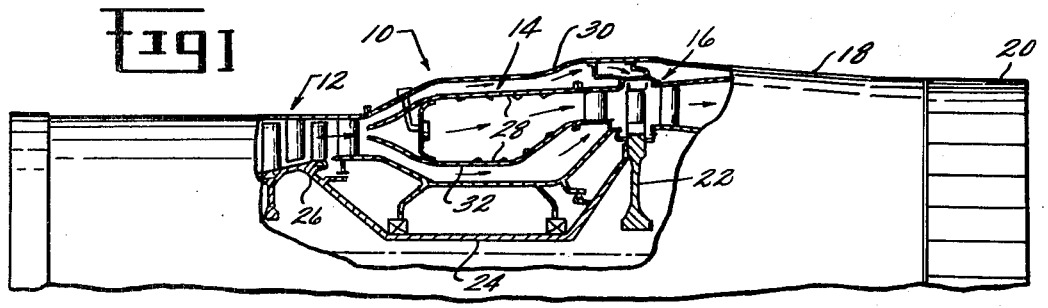
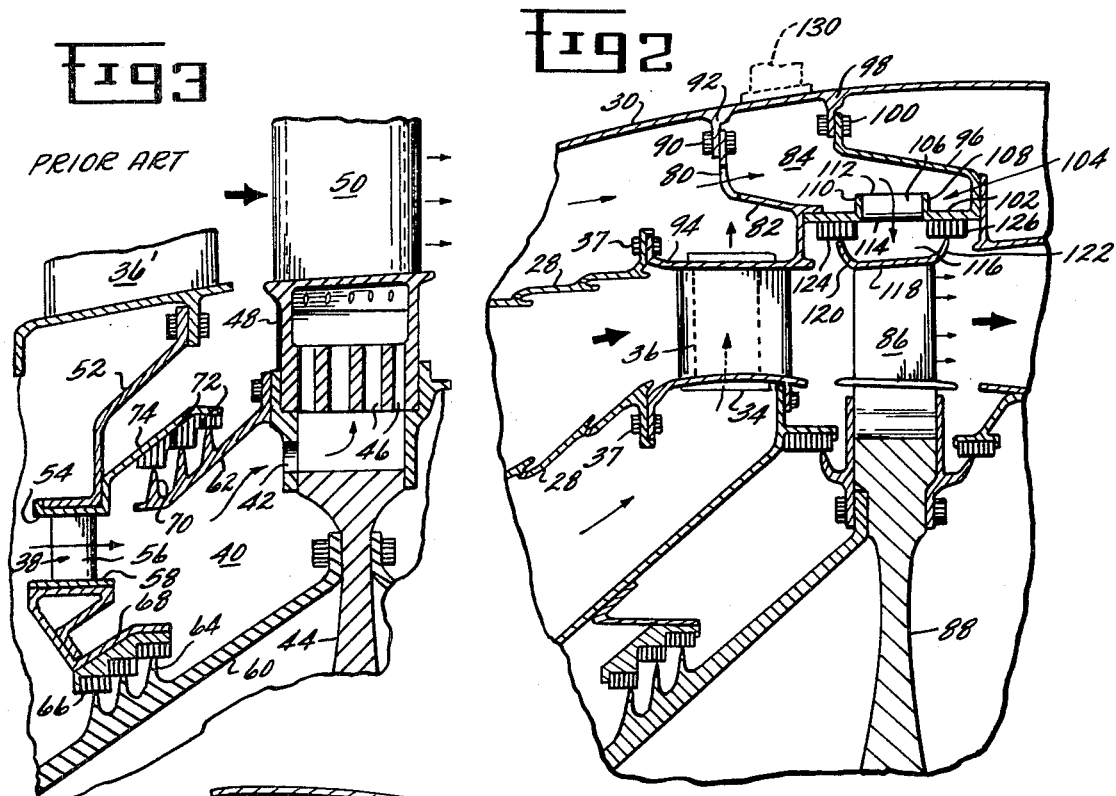
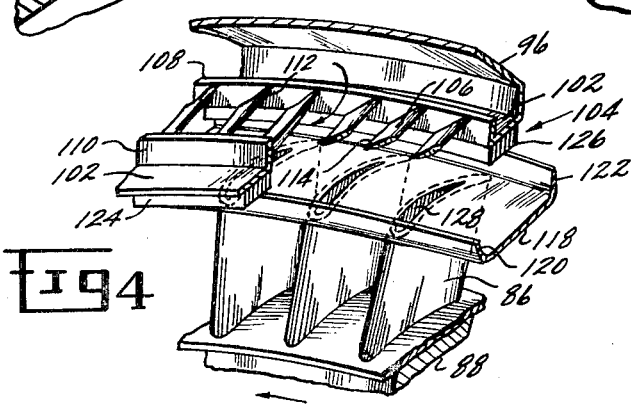
INVENTOR.
ELDON M. STEARNS
AGENT 3,703,808

TURBINE BLADE TIP COOLING AIR EXPANDER

BACKGROUND OF THE INVENTION

The present invention relates generally to improvement in gas turbine engines and, more particularly, to improvements in the cooling of turbine rotors in such engines. The invention herein described was made in the course of or under a contract, or a subcontract thereunder, with the United States Department of the Air Force.

Gas turbine engines of the type generally referred to herein conventionally comprise a compressor for pressurizing air to support combustion of fuel in the generation of a hot gas stream. This hot gas stream drives a turbine, connected to the compressor, and is then utilized to obtain a propulsive output or a powered shaft output from the engine. In order to obtain higher operating efficiencies and power outputs, the hot gas stream, when it passes through the turbine, is normally at a temperature exceeding the physical capabilities of the materials from which the turbine is fabricated. This is especially true when one considers the high stresses imposed on the turbine rotor. This situation has led to many proposals for providing cooling systems for the turbine, particularly for those portions thereof exposed to the high energy gas stream.

One such proposal is that relatively cool air, derived from the engine compressor, be directed through passageways formed in the turbine blades. The cooling effect provided by this air lowers the temperature of the blade material to a level at which melting or burning will not occur and at which the blade material has sufficient strength.

One of the more difficult problems encountered in cooling turbine rotors in this fashion is in internally ducting the cooling air from the compressor to the turbine, which is rotating at a high speed. In usual practice, the cooling air is bypassed internally of the engine combustor and then introduced into passageways formed in the turbine rotor. Generally, the entrances to these rotor passageways have a peripheral speed of several hundred to as high as many thousand feet per second.

It has thus been inherent in the delivery of cooling air to the turbine rotor that a relatively large amount of work must be done on the cooling air to introduce it into the rotor. This work input results in an increase in the temperature of the cooling air as it enters the turbine. This, in turn, reduces the cooling effectiveness of a given mass of air for reducing the temperature of the blades and other components of the turbine which are to be cooled thereby.

Previous attempts to overcome this problem have resulted in the use of cooling air expanders or inducers, which are placed in the cooling air passageway between the compressor and the turbine. These expanders normally comprise a plurality of nozzles which accelerate the cooling air in the direction of turbine wheel rotation just before the cooling air on and boards the turbine rotor. Such expanders provide a reduction in work required from the turbine to bring the cooling air up to wheel speed and a corresponding reduction in cooling air temperature. Such expanders, however, also introduce a more complicated cooling system in that they require additional high pressure seals. Such seals must be placed between the compressor and turbine rotating components and stationary frame members in order to provide the necessary internal cooling flow path between the compressor and the turbine.

SUMMARY OF THE INVENTION

It is an object of this invention, therefore, to minimize the work input to turbine cooling air and to thereby reduce the temperature of the cooling air entering a turbine rotor to cool the components thereof. It is a further object of this invention to minimize such work input while also eliminating the necessity for high pressure seals to form an internal cooling air passage.

Broadly stated, the objects of this invention are attained in a gas turbine engine, having a turbine rotor with blades projecting therefrom, by the provision of a blade tip cooling air expander and seal system wherein cooling air is introduced into a chamber located above the blade tips. The cooling air passes through a plurality of nozzles located over the rotating blades. These nozzles accelerate the cooling air in the direction of wheel rotation and discharge it into the chamber which is bounded by stationary case hardware, the cooling air nozzles, a rotation shroud on the blade tips, and sealing elements located at the upstream and downstream ends of the blade shroud. The cooling air then flows into a cooling circuit formed with each blade from the chamber via a passage through the blade shroud.

DESCRIPTION OF THE DRAWING

The above and related objects and features of the invention will become apparent from a reading of the following description of the disclosure which is given in connection with the accompanying drawings, with the novelty thereof being pointed out in the appended claims.

In the drawing:

FIG. 1 is a view in outline form, with portions broken away, of a gas turbine engine incorporation the present inventive cooling flow Pattern;

FIG. 2 is a longitudinal section, with portions removed, of the turbomachinery cooling mechanism of FIG. 1;

FIG. 3 is a longitudinal section, with portions removed, of a prior art cooling mechanism; and FIG. 4 is a partial perspective view taken in the direction of lines 4—4 of FIG. 2.

DETAILED DESCRIPTION OF A PREFERRED EMBODIMENT

Referring now to the drawings wherein like numerals correspond to like elements throughout, reference is specifically made to FIG. 1 wherein a gas turbine engine 10 is shown to include an axial flow compressor 12 which pressurizes air to support combustion of fuel in a combustor 14. The hot gas stream generated in the combustor 14 passes through and drives a turbine 16. The hot gas stream then enters an afterburner or reheat chamber 18, where additional fuel is selectively supplied and burned before the gas stream is discharged through an exhaust nozzle 20 to provide a propulsive force from the engine.

While the present description is limited to that of an afterburning turbojet engine, it will become readily apparent to one skilled in the art that the present invention is also applicable to non-afterburning turbojets, turbofan engines, stationary gas turbines for generating electric power, steam turbines, and the like. The present description is therefore given only to place the inventive cooling construction in proper perspective.

The turbine 16 comprises a compositely formed rotor 22 which is joined by a shaft 24 to a compositely formed rotor 26 of the compressor 12. The combustor 14 is of an annular type comprising liners 28 which are spaced from an outer casing member 30 and an inner casing 32 to provide a flow path for cooling air around the liners 28 and secondary air which enters the combustor 14 through the liners 28. Pressurized air discharged from the compressor 12 not only flows into these annular spacings and into the combustion chamber but, as shown in FIG. 2, also flows through openings indicated at 34 into the interiors of a plurality of stationary turbine nozzle vanes 36 which are located at the downstream ends of the liners 28 and are connected thereto by any suitable means such as bolts 37. This air thereafter provides a coolant fluid for the turbine rotor in a manner to be described.

In order to place the present invention in proper perspective, reference will now be briefly made to FIG. 3 wherein a prior art cooling scheme is detailed. As shown therein, the coolant, instead of being directed through outlet guide vanes 36', is routed through an annular nozzle 38 which directs the cooling air into an annular, rotating, entry chamber 40. Cooling air then passes from entry chamber 40 through one of a plurality of openings 42 formed in a turbine rotor wheel or disc 44. The cooling air then passes through passageways 46 formed in the bases of tangs 48 which are employed to mount turbine buckets or blades 50 on the disc 44. The blades 50 are provided with suitable coolant passageways, through which the air is directed, to provide the desired cooling mechanism for the blades.

As further shown in FIG. 3, the annular nozzle 38 is supported from the vanes 36' by an inwardly projecting cone 52, to which an outer rim or shroud 54 of the nozzle 38 is secured. The annular nozzle 38 is shown to include a plurality of nozzle vanes 56 which project inwardly between the outer shroud 54 and an inner shroud 58.

As was pointed out above, cooling air is directed from the nozzle 38 into the rotating chamber 40. This rotating chamber is defined in part by a conical shaft 60 (which comprises a portion of the turbine rotor 22) and by a flange 62 which is spaced radially outwardly from the conical shaft 60. Labyrinth teeth 64 are formed on the conical shaft 60 and cooperate with the sealing surfaces 66 on a ring shaped member 68, which is secured to the inner nozzle shroud 58; while teeth 70 project outwardly from the rotating flange member 62 and cooperate with sealing surfaces 72 on a ring shaped member 74, which is formed as an integral extension of the outer shroud 54. The labyrinth teeth 64, 70 and the sealing surfaces 66, 72 provide a rotating fluid seal for the chamber 40.

While the cooling system described in connection with FIG. 3 has proven to be much more efficient than the older practice of routing flow of cooling air from a plenum directly into passageway entrances on a turbine rotor having high peripheral speeds, it can be seen from the above that a somewhat complicated rotating structure is necessary to provide the desired acceleration of the cooling flow and the desired matching of circumferential velocity components of the cooling air and the rotor passage entrances. Also, work is required to pump the cooling air from the radius at which the cooling air boards the rotor outward to the blade radius where it is discharged. Increasing the radius at which cooling air boards the rotor reduces cooling air pump work, reduces cooling air temperature and results in increased turbine system efficiency. However, increasing this radius requires an increase in the radial dimensions of the previously mentioned seals, thereby complicating the seals.

It is the necessity for such complicated structures and the limitations on cooling air expander radius that the present invention attempts to overcome. With this in mind, reference is returned to FIG. 2 wherein a portion of the compressor discharge air flows around the liners 28, and instead of flowing through the nozzle 38 as in FIG. 3, flows through an opening 80 formed in vane support 82. In this manner, the cooling flow is directed into a stationary chamber 84 formed above the tips of rotating turbine blades 86, which are supported by a turbine wheel 88.

As shown in FIG. 2, the stationary chamber 84 is bounded on top by a portion of the outer casing 30 and on its upstream side by the vane support 82, which is connected to the outer casing 30 by any suitable means such as bolts 90 and an inwardly projecting flange 92. The vane support 82 additionally forms an outer band 94 to support the stationary turbine nozzle vanes 36, through which additional cooling flow may pass into the chamber 84, via openings 80, as previously discussed, or may be delivered into the main gas stream through suitable trailing edge holes.

The stationary chamber 84 is bounded on its downstream side by a generally U-shaped ring member 96 which is connected to the outer casing 30 by means of an inwardly projecting flange 98 and bolt 100. A leg 102 of the U-shaped ring member 96 forms the inner bounds of the chamber 84. The free end of the leg 102 may be rigidly connected to the vane support 82 by any suitable means such as welding.

As shown in FIGS. 2 and 4, the leg 102 also supports a cooling air expander or nozzle 104 which, in the present application, comprises a plurality of airfoil shaped vanes 106. The expander vanes 106 are arranged in a cascade and are supported on opposite ends by means of flanges 108, 110, which extend upwardly from the leg 102. Each of the vanes 106 has an airfoil shaped cross section and includes a leading edge 112 and a trailing edge 114. As is shown most clearly in FIG. 4, the vanes 106 are spaced so as to permit the flow of cooling air from the stationary chamber 84 into a cavity 116, which is formed above the tips of the turbine blades 86 as will presently be described. In addition, the vanes 106 are oriented in such a manner as to accelerate the cooling flow and also provide nearly tangential flow into the cavity 116.

The cavity 116 is formed by means of the leg 102, a rotating blade shroud 118, which is rigidly connected to the tips of the turbine blades 86, and fluid seals 120, 122. Leakage from the cavity 116 is controlled by means of the seals 120, 122, which may comprises radial and/or axial seals, and which in the present case, are shown to comprise radial teeth extending from and integrally formed with the blade shroud 118. The radial teeth cooperate with stationary sealing members 124 and 126, which are rigidly connected to the inner side of the leg 102.

As previously discussed, the vanes 106 are designed to accelerate the cooling flow and are oriented to provide nearly tangential flow into the cavity 116. The vanes 106 are further oriented in such a manner as to provide this flow in the direction or rotation of the turbine blades 86. In the ideal situation, the vanes 106 would provide cooling flow having little or no radial velocity component. Such a system would allow expansion of the cooling air to a high velocity (and thus a corresponding low temperature) without excessive cooling air velocity to rotating element velocity mismatch, thereby providing an increase in cooling efficiency.

The cooling flow passes from the cavity 116 into the interiors of the turbine blades 86 through any suitable coolant passageway formed therein. In the present application, the turbine blades 86 are shown to be of hollow construction; and the blade shroud 118 is shown to include an airfoil shaped opening 128 located above each of the turbine blades 86, which openings provide for the flow of coolant air from the cavity 116 into the interiors of the turbine blades 86. While the shape and design of the coolant passageway within the turbine blades 86 per se forms no part of the present invention, the blades 86 would probably include a plurality of trailing edge cooling holes to permit the coolant to exit from the blades 86 and to mix with the hot gas stream in a widely known manner.

In cases where it may prove necessary, provisions may be made for delivering cooling air to the stationary chamber 84 by means of external tubing 130, shown in phantom in FIG. 2. The use of such an external cooling air passageway provides a system which may easily incorporate a fuel or air heat exchanger into the cooling loop. Such an exchanger would utilize the low temperature of the fuel or of turbofan discharge air (in the case of a turbofan engine) to provide a lower temperature cooling air to the cavity 116 and to thus provide more efficient cooling of the turbine blades 86. With prior internal cooling paths such as the one shown in FIG. 3, the use of such a heat exchanger was severely limited because of the large amount of tubing needed to route fuel or air to the internal portions of the gas turbine rotor.

The turbine blade tip cooling air expander described in the present application provides a number of basic advantages over presently used systems. For example, the cooling air passages from the compressor to the turbine are greatly simplified, thereby resulting in a less complicated turbine and compressor rotor design, which because of simplified seal requirements would be characterized by decreased pressure losses. The disclosed arrangement yields substantially lower cooling air temperatures for the highly critical turbine blades 86 because the cooling air is delivered directly to the blades upon passing through the expander 104. The design also results in lower cooling air pump work being required to accelerate the cooling air to wheel speed. In this manner, much more efficient cooling is effected. In addition, the reduced cooling air pump work may permit the turbine to be designed at a higher radius than is conveniently used which, in turn, would result in higher aerodynamic efficiency. In presently used systems, increased cooling air pump work may more than balance aerodynamic efficiency gains which could be obtained by designing the turbine at a higher radius.

In addition, the above disclosed arrangement reduces cooling air pressure losses due to mismatch between cooling air velocity and wheel velocity where cooling air boards the wheel. By providing a pressurized shroud cavity, the arrangement also eliminates or reduces gas leakage which might otherwise occur across the tips of the turbine blades 86. This, in turn, increases the overall turbine efficiency. Finally, the cooling air provided to the pressurized shroud cavity 116 directly cools the blade shroud 118 and substantially eliminates prior cooling problems associated with such parts.

Although the blade shroud 118 is shown to be an integral ring, individual portions thereof could be formed with each of the blades 86. In such a case, each shroud portion would abut an adjoining portion and thereby provide the continuous ring needed to form the cavity 116. The appended claims are intended to cover this and all other equivalent changes.

What I claim is:
1. A turbomachinery cooling construction including:
   a turbomachinery rotor disc,
   a plurality of rotor blades radially disposed about the periphery of said disc and having airfoil portions provided with tips,
   a circumferentially extending, gas-flow confining, annular blade shroud mounted on said blade tips,
   a stationary structure radially spaced from and cooperating with said blade shroud to form an annular cavity around said shroud,
   means for delivering cooling air to said cavity as an accelerated tangential flow, and
   means for passing the cooling air from said cavity through said blades to effectively cool said blades.

2. A turbomachinery cooling construction as recited in claim 1 wherein said means for delivering the cooling air as an accelerated tangential flow comprise a plurality of stationary vanes supported by said stationary structure and adapted to pass the cooling air into said cavity.

3. A turbomachinery cooling construction as recited in claim 2 further characterized in that said stationary structure additionally forms an annular chamber around said annular cavity.

4. A turbomachinery cooling construction as recited in claim 3 wherein each of said vanes has a cross section which is of generally airfoil shape, including a leading edge which extends into said annular chamber and a trailing edge which extends into said cavity.

5. A turbomachinery cooling construction as recited in claim 4 wherein the means for passing said cooling air from said cavity through said blades includes openings formed in said blade shroud above each of said blades.

6. A turbomachinery cooling construction as recited in claim 5 wherein said blade shroud includes fluid seals for controlling the amount of leakage from said cavity.

7. A turbomachinery cooling construction as recited in claim 6 wherein said fluid seals comprise at least one radial tooth at each end of said shroud and a stationary sealing member connected to said stationary structure in such a manner as to cooperate with said radial teeth.

8. A turbomachinery cooling construction as recited in claim 7 further characterized in that said stationary structure supports a plurality of turbine nozzle vanes, said vanes including cooling air passageways therethrough.

9. A gas turbine engine including a compressor, a combustion system for generating a high energy, annular gas stream, and a turbine for driving said compressor, said turbine including a rotating disc, a plurality of rotor blades radially disposed about the periphery of said disc and having airfoil portions provided with tips, a circumferentially extending, gas-flow confining, annular blade shroud mounted on said blade tips, a stationary structure radially spaced from and cooperating with said blade shroud to from an annular cavity around said shroud, means for delivering cooling air radially inwardly to said cavity as an accelerated tangential flow having a relatively small radial velocity component, and means for passing the cooling air from said cavity through said blades to effectively cool said blades.

10. A gas turbine engine as recited in claim 9 wherein said means for delivering cooling air comprise a plurality of stationary vanes, of airfoil cross section, supported by said stationary structure and adapted to pass the cooling air into said cavity.

* * * * *